Patented Feb. 16, 1926.

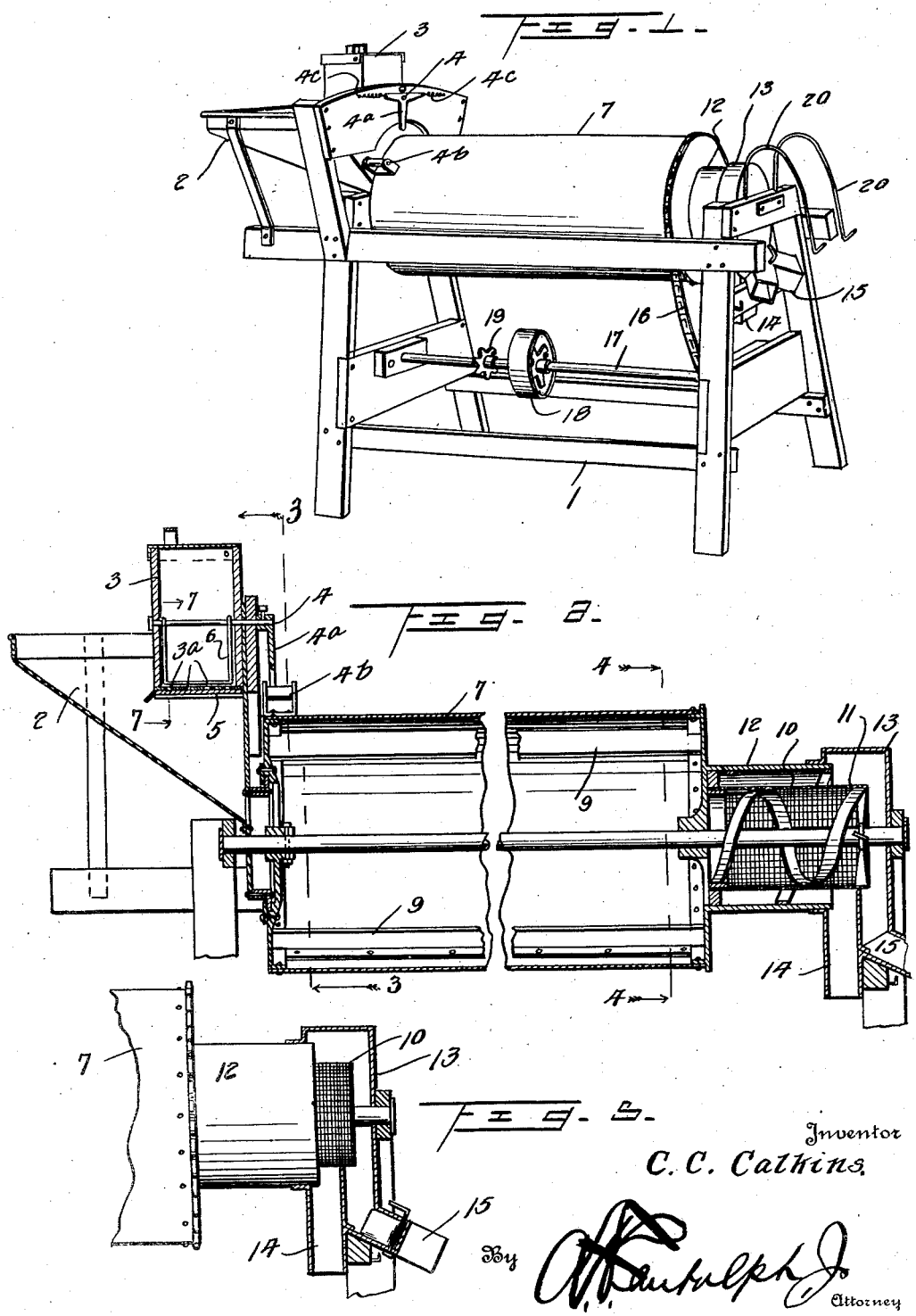

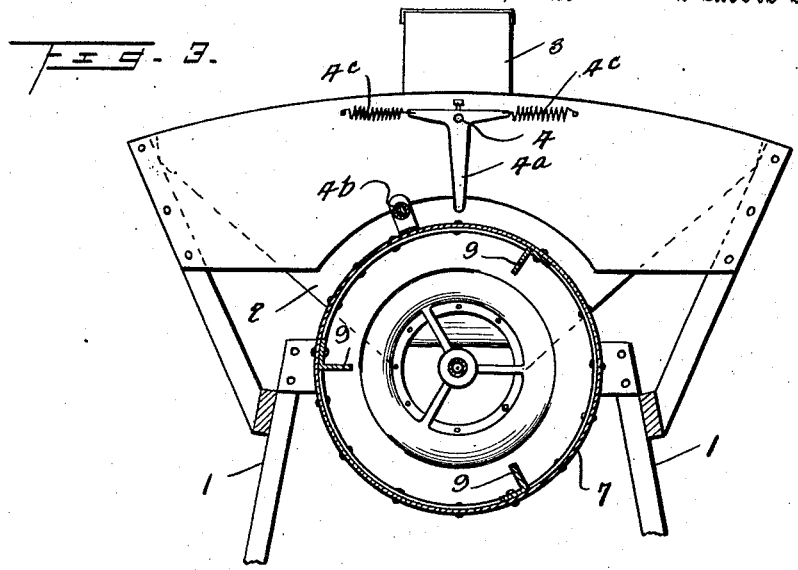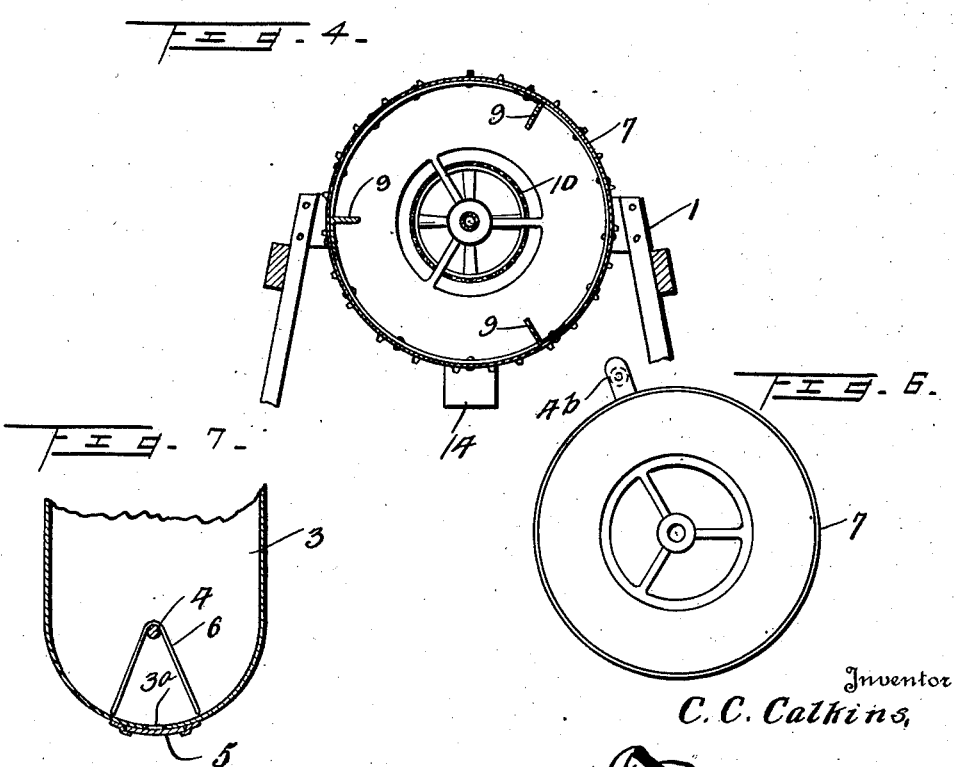

1,573,142

UNITED STATES PATENT OFFICE.

CLAUDE C. CALKINS, OF SPOKANE, WASHINGTON.

MACHINE FOR TREATING SEED GRAIN.

Application filed June 28, 1923. Serial No. 648,330.

*To all whom it may concern:*

Be it known that I, CLAUDE C. CALKINS, a citizen of the United States, residing at Spokane, in the county of Spokane and State of Washington, have invented certain new and useful Improvements in Machines for Treating Seed Grain, of which the following is a specification.

The present invention relates particularly to machines for treating seed grain, such as wheat, by coating the grain while in the machine, with powder or material which will be instrumental in withstanding the attacks on the seed grain of disease or fungus growth, as smut, after the seed grain has been planted.

The present invention provides a machine especially adapted for treating grain by the dry method, and has for its primary object the application of a powder, such as copper carbonate, to the seed grain, in proper quantities. This powder is supplied in regulated quantities, the grain and powder agitated and thoroughly mixed to coat the grain, and the excess powder is separated from the coated grain and recovered for future use. After the excess powder has been separated from the grain the coated grain is discharged from the machine and properly cared for.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of a machine for treating grain according to my invention.

Figure 2 is a vertical central longitudinal sectional view of the machine.

Figure 3 is a transverse sectional view at line 3—3 of Figure 2.

Figure 4 is a transverse section at line 4—4 of Figure 2.

Figure 5 is a detail sectional view at the discharge end of the machine.

Figure 6 is a detail view in elevation of the receiving head of the rotary drum.

Figure 7 is an enlarged sectional detail view at line 7—7 of Figure 2.

In carrying out my invention I utilize a main frame 1 for supporting the operating parts of the machine, and at the front end of the main frame a feed hopper 2 is located at the proper elevation. This hopper receives the seed grain to be treated from a fanning mill or other suitable source of supply, and within the upper portion of the hopper 2 a smaller hopper or powder box 3 is supported. This latter hopper or box is adapted to contain copper carbonate or other similar powdered material for treating the grain, and feed the powder to the seed as the latter is fed through its hopper.

The bottom of the hopper 3 is perforated with a series of alined holes $3^a$ formed therein for discharge therethrough of the powder, and this discharge is regulated as to quantity by means of an adjustable slide plate 5 which controls the number of uncovered openings in the hopper bottom. The slide plate is located beneath the perforated bottom and has suitable guideways for guiding it in its movement and retaining it in position. By means of the slide plate the proportion of powder to the quantity of grain may be fixed as desired.

To stir the powder within its hopper and prevent packing thereof I utilize a U-shape agitator 6 which swings across the bottom of the hopper above its perforations $3^a$ and brushes the powder through the perforated hopper bottom, to insure a free feed of the powder.

The U-shaped stirrer depends from and is carried by a rock shaft 4 which is journaled in suitable bearings in the powder-hopper, and one end of this shaft projects through the hopper wall and through a portion of the main frame of the machine. On this projecting end of the shaft is carried a T-lever $4^a$ that is located in the path of rotary movement of a roller-tappet $4^b$ which tappet is carried by the rotary drum 7. With each revolution of the drum and tappet the lever is oscillated. A pair of opposed springs $4^c$ attached to the T-lever and anchored at their outer ends on a portion of the main frame afford a resilient cushion for the oscillating movement of the T-lever and by their action tend to bring the T-lever to its normal perpendicular position as seen in Figure 1. The T-lever rocks the rock shaft and through the latter the U-shaped stirrer is swung back and forth over the perforated bottom of the powder hopper to insure proper feed of the powder therethrough.

The rotary drum 7 is of cylindrical form and is journaled to revolve on the longitudinally disposed shaft 7ª. The shaft is supported in the main frame of the machine and the drum is provided with spider-heads 8, and 8' respectively at the front and rear ends thereof.

The seed grain and powdered material are fed to the rotary drum through the lower portion of the hopper 2 thence through the spider head or open head 8 of the drum to the interior of the latter. Within the rotary drum are arranged a series of longitudinally extending ribs or blades 9, spaced about the inner periphery of the cylindrical drum, and designed to pick up and drop and thus agitate the seed and powder in order that the latter may thoroughly coat the former, thus insuring the proper treatment of the grain.

At the discharge end of the rotary drum an axially alined cylindrical screen 10 of less diameter than the drum, is attached to rotate with the drum, and within this screen is a spiral blade 11 attached to the inner periphery of the screen for conveying the seed longitudinally through the screen.

The rotary screen is encased by a cylindrical shell or casing 12 attached to and rotating with the drum, and within the screen the excess powder is separated from the grain by passage through the perforated wall of the screen. The coated seed grain passes out through the discharge end of the screen into a fixed outlet box 13, which is provided with an outlet passage 14 for excess powder, and also with a discharge, forked spout 15. The excess powder is recovered at the spout 14 and the seed grain is emptied into suitable bags (not shown) connected with the forked spout 15.

For rotating the drum with its casing 12 and screen 10 on the shaft 7ª I may utilize a sprocket drive 16 from the operating shaft 17, the sprocket drive passing around the drum as shown in Figure 1 in operative relation thereto to impart the necessary rotation to the drum and its parts. Power is applied to the shaft 17 through a pulley 18 thereon which pulley is driven by a belt (not shown) in usual manner. A sprocket wheel 19 is also indicated on the shaft 17 which may be utilized to drive a fanning mill or similar device if required.

For convenience of suspending the bags to receive the seed grain, hooks as 20 are utilized at the discharge end of the machine in proximity to the forked spout 15, as seen in Figure 1.

What is claimed is:

1. The combination in a grain treating machine with a rotary drum and a main hopper, of a powder hopper disposed within the main hopper and having means for adjusting the area of an opening in the bottom of said powder hopper, an agitator in the powder hopper, and means carried by the drum for operating the agitator.

2. The combination with a rotary drum, a main hopper, and a powder hopper having adjustable means for varying its opening to the main hopper, of an agitator in the powder hopper, a spring retained actuating device pivoted on the main hopper, and a tappet carried by the drum for co-action with said device.

In testimony whereof I affix my signature.

CLAUDE C. CALKINS.